United States Patent [19]

Kawamoto et al.

[11] Patent Number: 5,367,454
[45] Date of Patent: Nov. 22, 1994

[54] INTERACTIVE MAN-MACHINE INTERFACE FOR SIMULATING HUMAN EMOTIONS

[75] Inventors: Koushi Kawamoto; Kengo Omura, both of Kanagawa, Japan

[73] Assignee: Fuji Xerox Co., Ltd., Tokyo, Japan

[21] Appl. No.: 81,703

[22] Filed: Jun. 25, 1993

[30] Foreign Application Priority Data

Jun. 26, 1992 [JP] Japan .................................. 4-169574

[51] Int. Cl.⁵ .............................................. G06F 15/00
[52] U.S. Cl. ................................. 364/419.20; 345/122
[58] Field of Search .................... 364/419.20; 340/725, 340/732; 395/118, 152

[56] References Cited

U.S. PATENT DOCUMENTS

| | | | |
|---|---|---|---|
| 4,104,625 | 3/1978 | Bristow et al. ................. | 340/324 R |
| 4,459,114 | 7/1984 | Bavwick .............................. | 434/307 |
| 4,569,026 | 2/1986 | Best ..................................... | 364/512 |
| 4,642,710 | 2/1987 | Martha et al. ........................ | 360/79 |
| 4,646,172 | 2/1987 | Lemelson ............................ | 360/33.1 |

FOREIGN PATENT DOCUMENTS 2-83727 3/1990 Japan .

OTHER PUBLICATIONS

Suenaga et al., "Human Reader: An Advanced Human Machine Interface Based On Human Images and Speech", The Transactions of the Institute of Electronics, Information and Communication Engineers, D-II, vol. J75-D-II No. 2 pp. 190–202, Feb. 1992.

Primary Examiner—Gail O. Hayes
Attorney, Agent, or Firm—Finnegan, Henderson, Farabow, Garrett & Dunner

[57] ABSTRACT

An interactive man-machine interface system displays an animated face that exhibits human-like emotions. The system stores data representing each of eight basic emotions and continually changes the level of each basic emotion depending on environmental stimuli, internal reactions between the emotions, and the passage of time. The environmental stimuli include, for example, specific comments made by the user that are recognized by the system, the successful completion of a task, and failure to complete a task. The degree of internal reactions between emotions is programmed before operation. For example, an increase in anger causes a predetermined decrease in joy. Finally, all eight basic emotions are made to reduce in intensity over time. Based on a database of facial expressions, the system displays a composite expression corresponding to the intensity levels of all eight basic emotions.

3 Claims, 5 Drawing Sheets

INTERACTIVE MAN-MACHINE INTERFACE FOR SIMULATING HUMAN EMOTIONS

BACKGROUND OF THE INVENTION

The present invention relates to an interactive system and more particularly to an emotion emulator for producing pseudo-emotions of an artificial agent in an interactive information input/output system using the personified agent.

Heretofore, there have been utilized input means such as keyboard and mouse for helping users communicate with information processing units, and display screens such as CRTs as means of making processing units display symbolic information in response, so that various operations are performed in an interactive mode.

However, the recent development of information processing environment is attaining the stage of fostering machine-to-man coordination by putting into practice the exchange of mutual intentions between the information unit or a machine and the user or a human, using a wide range of information including emotions.

Some of the interactive systems that have been proposed so far are arranged so that a personified artificial agent (hereinafter simply called "agent") appears on the screen and speaks to users by means of its image and speech synthesis (e.g., Suenaga et al., Collection of Papers, Vol. J75 - D - II, No. 2, 190 - 202, Feb., 1992, Electronic Communication Society).

With respect to a system capable of voice conversation, Unexamined Japanese Patent Publication Hei-2-83727/(1990), for example, discloses what provides a natural speaking face image by controlling the lip movement of an agent on a display screen in accordance with an utterance resulting from speech synthesis on the part of the system.

As studies in models of artificial emotion, a model of artificial emotion with the application of the harmony theory has been referred to by Mogi and Hara in "Shingaku Technical Report HC91-42," and a method of mapping between the mood and the facial expressions has also been proposed by Kitamura et al. in "Trial of Forming Facial Expressions Using Models of Emotion" (Collection of Preliminary Papers, Meeting in Spring 1992, Electronic Data Communication Society).

Nevertheless, an interactive system incorporating pseudo-emotion into an electronic agent still remains unreported.

The agent as a partner of conversation in the conventional interactive system with such an electronic agent only gives utterance accompanied with a simple variation of facial expression but it is not given the power of expressing pseudo-emotion after the human emotion model. In consequence, the personification of the agent as viewed from the user is not thoroughgoing and the agent lacking in emotional expressions has not only little affinity for the novice user but also weak power to encourage users in general to input information actively. The problem is that smooth exchange of intentions is unlikely.

SUMMARY OF THE INVENTION

An object of the present invention is to provide an emotion emulator which is designed to attain natural interaction with users and candid exchange of mutual intentions by giving an agent a pseudo-emotion model as an internal mood model so as to make the agent behave more like a human.

In order to accomplish the object above, according to the first aspect of the present invention, it is provided a storage means for holding the intensity of basic emotions so as to provide an agent with artificial emotion. In this case, eight basic elements of the emotions that have been made known by psychological studies as in "Emotion and Personality," Pluchik. R, Modern Fundamental Psychology 8, Tokyo University Press, may be enumerated.

Furthermore, according to the second aspect of the present invention, it is varied the intensity of basic emotions which an agent possesses by making use of phenomena resulting from working environment, that is, by a means for increasing the intensity of basic emotions of a predetermined agent by predefined differential values in accordance with conditions of the utterance received by the agent from a user, the achievement status for a given task being accomplished by the agent, presumption on the possibility for the goal-fulfillment and the like.

Furthermore, according to the third aspect of the present invention, it is provided a means for causing the emotional condition to autonomously vary by predetermining the interaction between basic emotions and making the interaction occur at fixed time intervals so as to increase and decrease the intensity of basic emotions.

Furthermore, according to the fourth aspect of the present invention, it is provided a means for placing the intensity of basic emotions in a steady state, that is, placing the total emotional condition in the neutral status as the intensity of basic emotions exponentially attenuates with the lapse of time long enough for any phenomenon to be prevented from arising in the working environment.

As shown in FIG. 1, an emotion emulator according to the present invention comprises: a basic emotion memory 1 for storing the intensity of basic emotions constituting an overall artificial emotion system, an emotional stimulus detector 2 for detecting input of an emotional stimulus in working environment, a deferential value memory 3 for pre-storing a differential value for instructing the extent of varying basic emotion depending on the kind and intensity of the emotional stimulus detected by the emotional stimulus detector 2, an intensity revisor 4 for revising the intensity values of basic emotions stored in the storage means 1 according to the emotional stimulus detected by the emotional stimulus detector 2 and the differential value stored in the deferential value memory 3, an internal mutual interaction memory 5 for preholding the intensity of internal mutual interaction between basic emotions, an intensity revisor 6 for revising the intensity value of basic emotion stored in the basic emotion memory 1 according to the intensity of basic emotions stored in the basic emotion memory 1 and the intensity of mutual interaction stored in the internal mutual interaction memory 5, and a time dependent attenuator 7 for periodically reducing the intensity of basic emotions stored in the basic emotion memory 1.

With the storage of basic emotions according to the first aspect of the present invention as noted above, agent's emotional condition can be read out in real time, so that it can immediately be reflected in its facial expression and task performance.

With the acceptance of environmental emotional stimulus according to the second aspect above, agent's emotions quickly change with various happenings in task performance environment, thus making variations of flexible pseudo-emotions available.

As agent's complex emotional behavior is defined by the interactive means according to the third aspect above, the subtle autonomous fluctuation of emotions independent of external factors can be brought about.

The time dependent attenuator according to the fourth aspect above functions as a stabilizer of emotion. When an interactive information processing console is applied, agent's emotions will have to be strictly user-friendly and desirably free from any instable temperament. When no emotional stimulus exists, the time dependent attenuator acts on leading agent's emotions to a moderate mood.

More specifically, the basic emotion memory 1 for storing the intensity of basic emotions in the system configuration shown in FIG. 1 holds the intensity of basic emotions constituting the overall artificial emotion system offered by the agent.

The differential value memory 3 for storing the intensity of emotional stimulus pre-stores a differential value for instructing the extent of varying basic emotion depending on the kind and intensity of the emotional stimulus detected by the detector 2 for detecting input of an emotional stimulus in working environment.

The intensity revisor 4 for revising intensity values of basic emotions revises the intensity of basic emotions stored in the basic emotion memory 1 according to the emotional stimulus detected by the detector 2 and the differential value stored in the memory 3.

The intensity revisor 6 for revising the intensity value revises the intensity of basic emotions stored in the basic emotion memory 1 according to the intensity of basic emotions stored in the memory 1 and the intensity of internal mutual interaction stored in the memory 5 for pre-holding the intensity of internal mutual interaction between basic emotions.

The time dependent attenuator 7 periodically reduces the intensity of basic emotions stored in the memory 1 with the lapse of time and converges the intensity value to the neutral emotional status on condition that no external stimulus exists and that the interaction between basic emotions is sufficiently small.

With the arrangement above, it is possible to provide an emotion emulator capable of forming pseudo-emotion very similar to human emotion and realizing natural interaction with users by making the agent behave more like a human.

DETAILED DESCRIPTION OF THE PREFERRED EMBODIMENTS

Referring to the accompanying drawings, a detailed description will subsequently be given of an embodiment of the present invention.

Figure 1:
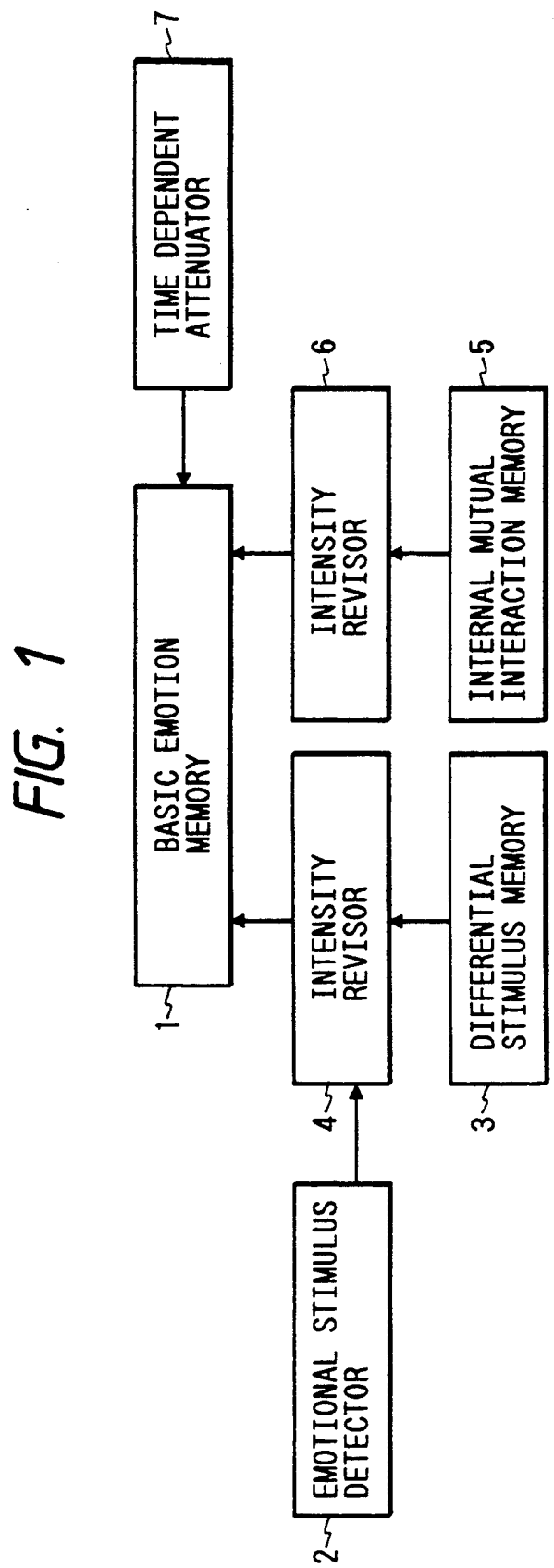
FIG. 1 is a block diagram illustrating a system configuration according to the present invention.
Figure 2:
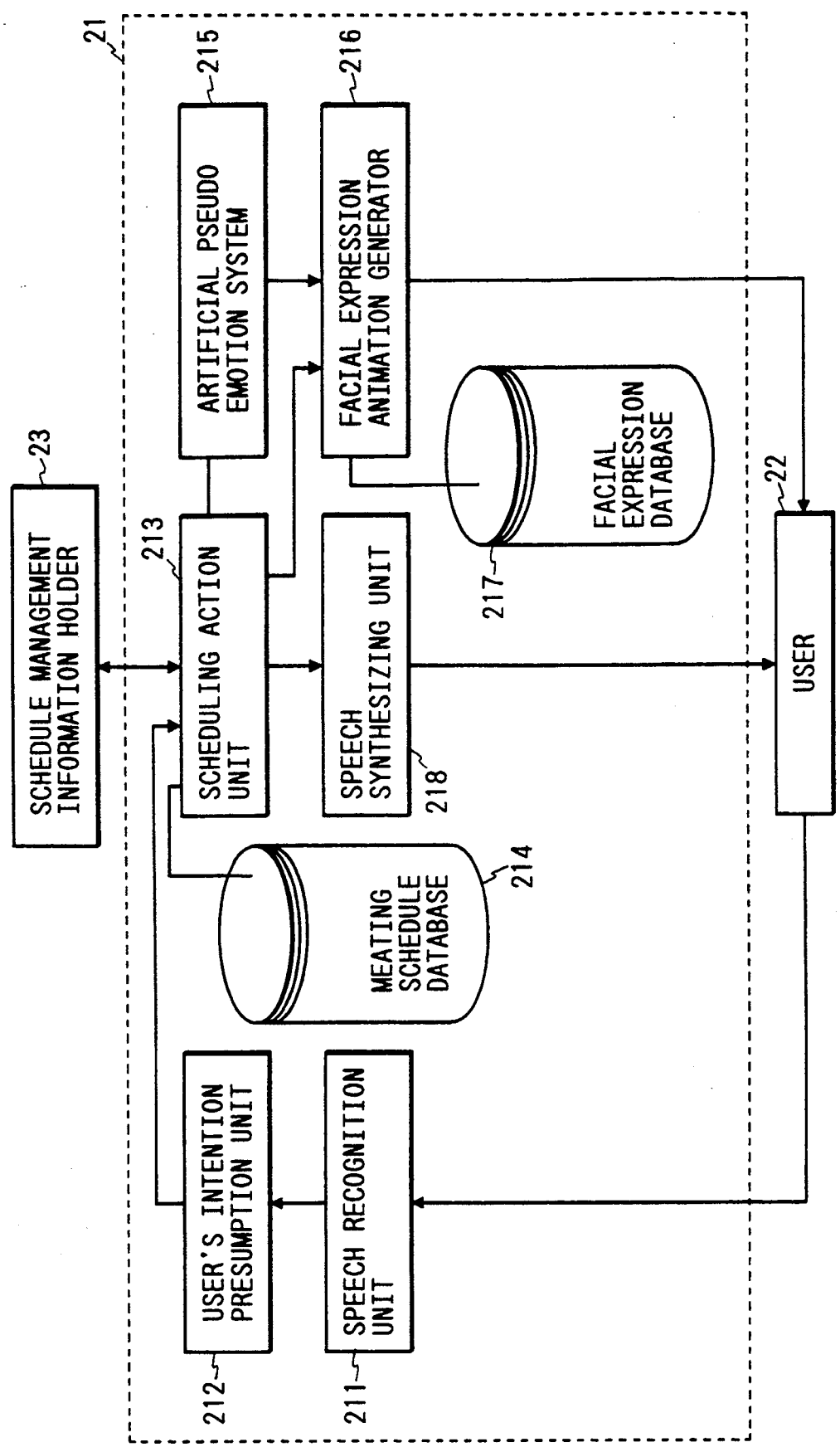
FIG. 2 is a block diagram illustrating a configuration of an emotion emulator embodying the present invention applied to an interactive schedule management system.

FIG. 2 is a block diagram of an emotion emulator according to the present invention as what is applied to a speech interactive schedule management system in which an agent speaks to interact with a user in order to lay out schedules for meetings, tour itineraries and the like.

In FIG. 2, numeral 21 denotes an agent type interface, 22 a user, 23 a schedule management information holder, 211 a speech recognition unit, 212 a user's intention presumption unit, 213 a scheduling action unit, 214 a meeting schedule database, 215 an artificial pseudo emotion system, 216 a facial expression animation generator, 217 a facial expression image database, and 218 a speech synthesizing unit.

First, an utterance of the user 22 is recognized in the speech recognition unit 211 and the user's intention presumption unit 212 presumes the intention of user's operation from the coded contents of the utterance.

While referring to the meeting schedule database 214 and while interacting with the user with the aid of synthesized speech via the speech synthesizing unit 218, the scheduling action unit 213 plans to move or erase a schedule in line with the user's intention. At this time, a request for the activation of certain basic emotion as what is based on the user's intention is sent to the artificial emotion system 215. Conversely, the pseudo-emotional condition is also transmitted to the scheduling action unit 213, whereby it affects the agent's action.

When a series of actions scheduled in the scheduling action unit 213 are executed with success (or failure), the results are transmitted to the artificial emotion system 215 and cause the pseudo-emotional condition to vary.

The emotional condition of the agent is incessantly recognized by the facial expression animation generator 216 as the animation of the facial expression with reference to the facial expression image database 217 and offered via an image display means (not shown) to the user 22 as information on the emotional condition of the agent.

Figure 3:
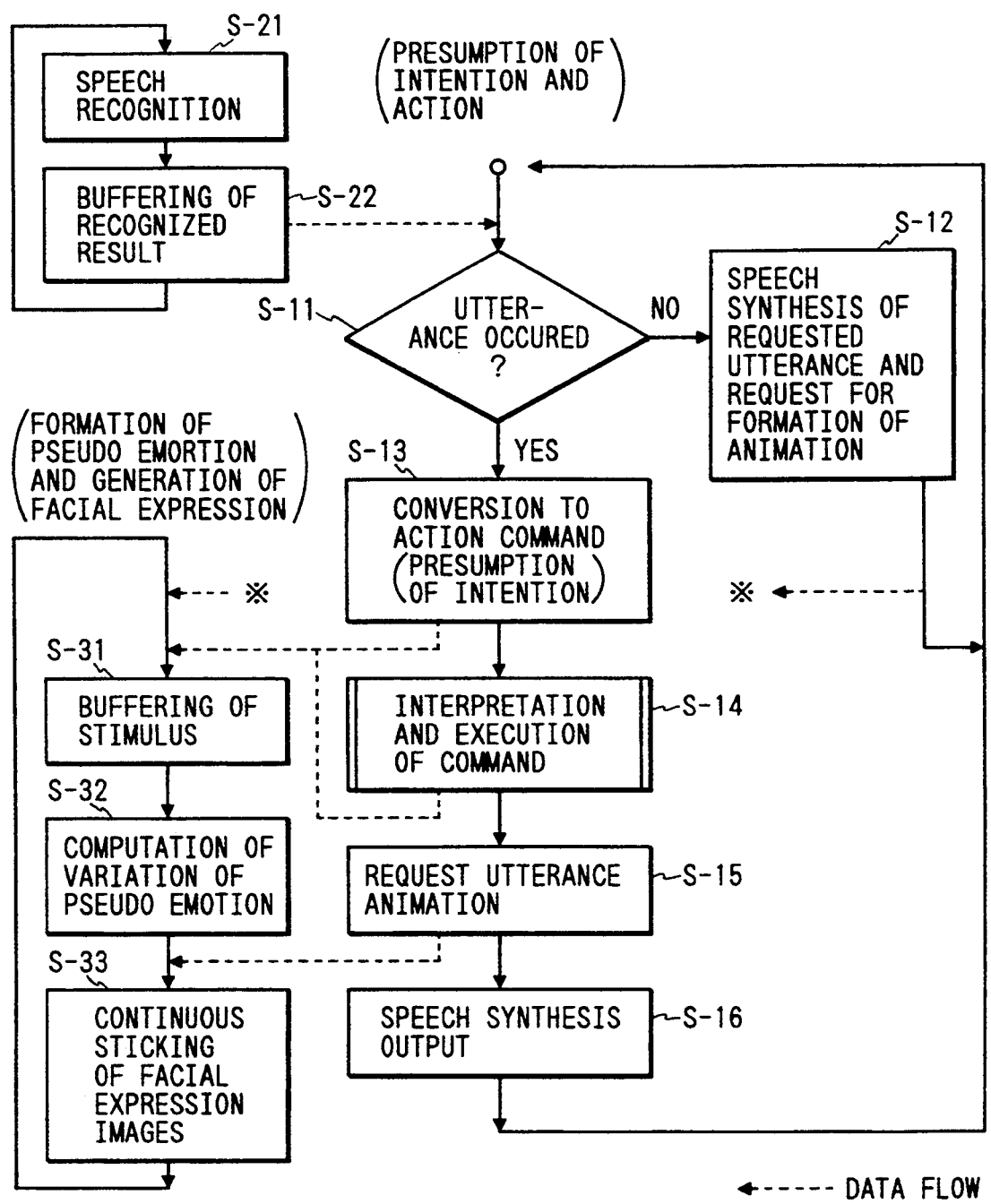
FIG. 3 is a process flowchart for the interactive schedule management system of FIG. 2.

FIG. 3 is a flowchart illustrating the arrangement of the steps in a multi-process including "speech recognition" through taking in user'utterance, "presumption of intention and action" and "formation of pseudo-emotion and facial expression" in the interactive schedule management system.

In the process of "presumption of intention and action" of FIG. 3, the user's intention presumption unit 212 monitors the presence or absence of utterance (S-11). If utterance is absent (No at S-11), data designating the absence of utterance is given to the scheduling action unit 213. The scheduling action unit 213 instructs the speech synthesizing unit 218 to synthesize speech of a request for utterance and notifies the artificial emotion system 215 of the presence of the request therefor (S-12). The artificial emotion system 215 buffers a stimulus like this request for utterance (S-31), computes variations in pseudo-emotion (S-32) and instructs the facial expression animation generator 216 to form the animation of the facial expression. The facial expression animation generator 216 continuously sticks together facial expression images corresponding to the requested utterance by reference to the facial expression image database 217 (S-33).

When the user gives utterance, the speech recognition unit 211 recognizes it (S-21), buffers the result of recognition (S-22) and delivers data on the contents of utterance to the user's intention presumption unit 212. The user's intention presumption unit 212 converts the user's intention presumed from the utterance into an action command (S-13) and delivers the action command to the scheduling action unit 213.

The scheduling action unit 213 interprets and executes the action command (S-14), requests the corresponding animation of the utterance from the facial expression animation generator 216 (S-15) and instructs the speech synthesizing unit 218 to output corresponding speech so that the synthesized speech is output (S-16).

On the other hand, data on the action command accompanied with the presumption of the intention is transmitted to the artificial emotion system 215 and the artificial emotion system 215 buffers a stimulus likewise (S-31), computes variations in pseudo-emotion (S-32) and instructs the facial expression animation generator 216 to form the animation of the facial expression. The facial expression animation generator 216 continuously sticks together facial expression images by reference to the facial expression image database 217 (S-33).

Figure 4:
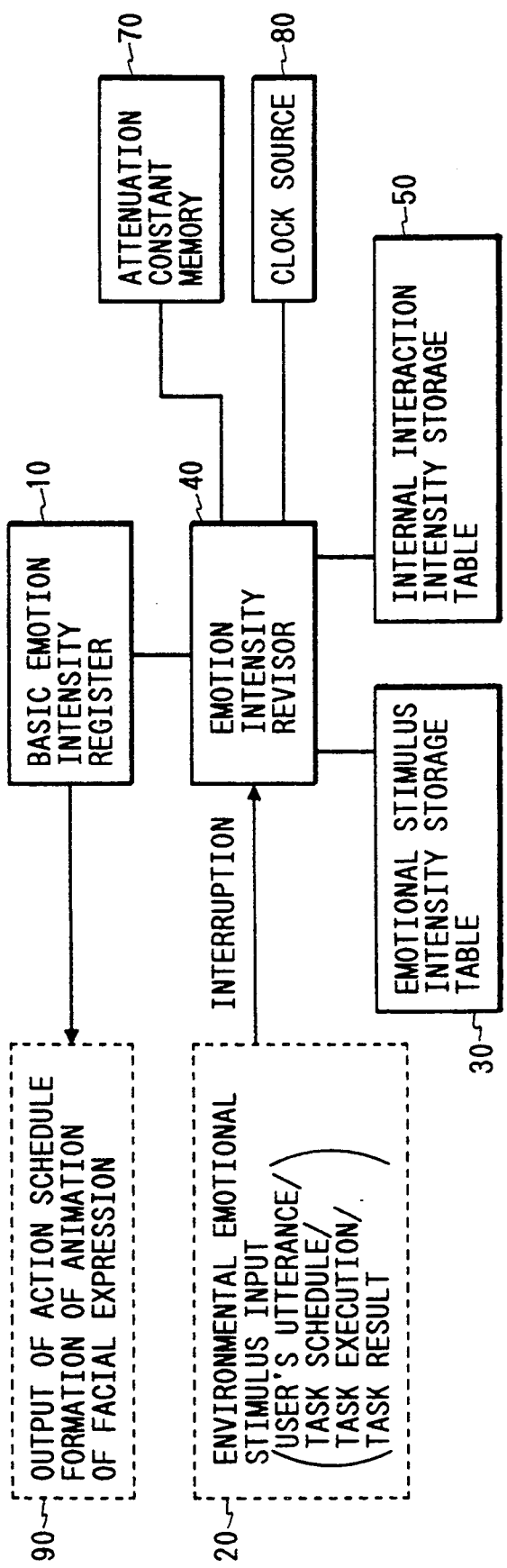
FIG. 4 is a block diagram illustrating an artificial emotion system configuration.

FIG. 4 is a block diagram illustrating an artificial emotion system configuration, wherein numeral 10 denotes a register for the intensity of each of eight basic emotions, 20 an environmental emotional stimulus input, 30 an emotional stimulus intensity storage table, 40 an emotion intensity revisor, 50 an internal interaction intensity storage table, 70 an attenuation constants memory, 80 a clock source, and 90 an output of action schedule/formation of animation of facial expression.

In FIG. 4, the register 10 are used for respectively storing the intensity of eight basic emotions (surprise, anger, disgust, fear, joy, acceptance, expectation and sadness).

The emotion intensity revisor 40 revises the contents of the register 10 for the intensity of each basic emotion on the basis of the occurrence of an emotional stimulus and mutual interactions between each two basic emotions and also revises desired registers constituting the register 10 for the intensity of each basic emotion in a manner that exponentially attenuates the intensity with the lapse of time according to attenuation constants stored in the attenuation constants memory 70. The emotion intensity revisor 40 operates according to a clock pulse from the clock source 80 at predetermined time intervals.

A description will subsequently be given of the operation of the artificial emotion system thus arranged in the following order: "change of basic emotions under the condition of certain emotional stimulus", "change in internal emotion interaction", and "attenuation of basic emotions with the lapse of time."

1. Change of basic emotions under the condition of certain emotional stimulus.

It is dependent on the user's utterance, the contents of the operation sequence planned in the scheduling unit and the result of the operation sequence how emotions vary in task performance environment. In this case, the working environment as an emotional stimulus includes "user's utterance/task schedule/task execution/task results."

The incremental amount of basic emotion is prestored in the emotional stimulus intensity storage table 30 of FIG. 4 as a pair of the contents of emotional stimulus and the incremental amount of basic emotion.

Followings show examples of revision of the intensity of the basic emotion and when the emotion intensity revisor 40 receives an interruption of an emotional stimulus occurrence, the contents of emotional stimulus are matched with the emotional stimulus intensity storage table 30 and the corresponding increment is added to the register 10 for the intensity of each of the eight basic emotion.

More specifically, in example 1, IF: no voice signal is obtained from the user (no user's utterance) despite repetition of input request made by the agent→THEN: increase the value of anger in the basic emotion register by 2 units.

In example 2, IF: requested task is completed by agent's action by applying the agent's operation→THEN: increase the value of joy in the basic emotion register by 1 unit.

In example 3, IF: voice recognition is continuously failed →THEN: increase the value of sadness in the basic emotion register by 0.5 unit.

In example 4, IF: a conference room is occupied, no schedule is suited for every members, or meeting schedule is fallen on other meeting→THEN: increase the value of sadness by 1 unit and the value of disgust by 0.5 unit in the basic emotion register.

In example 5, IF: during conversation, user's manual operation is started by a mouse→THEN: increase the value of sadness by 0.5 unit, the value of anger by 0.5 unit, and value of disgust by 0.5 unit in the basic emotion register.

In example 6, IF: scheduling tool is hang up→THEN: increase the value of surprise by 2 units and the value of fear by 1 unit.

In example 7, IF: processing of voice recognition becomes slow→THEN: increase the value of fear by 1 unit and the value of disgust by 0.5 unit.

In example 8, IF: processing of the artificial agent itself becomes slow→THEN: increase the value of fear by 2 units and the value of sadness by 1 unit.

In example 9, IF: window of the agent is moved by mouse→THEN: increase the value of fear by 0.5 unit and the value of surprise by 1 unit.

In example 10, IF: window of the agent make be small→THEN: increase the value of disgust by 0.5 unit and the value of anger by 1 unit.

In example 11, IF: user name of utterance is not in user list→THEN: increase the value of fear by 0.5 unit, In example 12, IF: voice signal is inputted even when the artificial agent is not in a condition of voice recognition→THEN: increase the value of disgust by 0.5 unit.

In example 13, IF: user carry out unacceptable action, for example closing of window during action→THEN: increase the value of anger by 0.5 and the value of disgust by 0.5 unit.

In example 14, IF: continuous searching of conference room and schedule is succeed by minor change after the searching has been failed once→THEN: increase the value of surprise by 0.5 unit and the value of joy by 1 unit. In example 15, IF: trigger word for each basic emotion is detected in utterance of user→THEN: the values of basic emotions are increased in accordance with the following list.

| Key word | Joy | Acceptance | Fear | Surprise | Sadness | Disgust | Anger | Expectation |
|---|---|---|---|---|---|---|---|---|
| "Thank you" | 2.0 | 1.0 | 0.0 | 0.0 | 0.0 | 0.0 | 0.0 | 0.5 |
| "Big help!" | 1.0 | 0.5 | 0.0 | 0.0 | 0.0 | 0.0 | 0.0 | 0.5 |
| "O.K." | 1.0 | 0.0 | 0.0 | 0.0 | 0.0 | 0.0 | 0.0 | 0.5 |
| "Well done!" | 0.5 | 1.0 | 0.0 | 0.0 | 0.0 | 0.0 | 0.0 | 0.5 |
| "That would be well" | 0.5 | 0.5 | 0.0 | 0.0 | 0.0 | 0.0 | 0.0 | 1.0 |
| "Dumb" | 0.0 | 0.0 | 0.0 | 0.5 | 1.0 | 0.5 | 0.0 | 0.0 |
| "Stupid" | 0.0 | 0.0 | 1.0 | 1.0 | 0.0 | 0.0 | 0.0 | 0.0 |
| "Leave me alone" | 0.0 | 0.0 | 0.5 | 0.5 | 0.5 | 0.5 | 0.5 | 0.0 |
| "Stop it" | 0.0 | 0.0 | 0.0 | 1.0 | 0.0 | 0.5 | 0.0 | 0.0 |
| "Fooling around" | 0.0 | 0.0 | 0.5 | 0.5 | 0.0 | 0.0 | 0.0 | 0.0 |
| "Hey you!" | 0.0 | 0.0 | 1.0 | 1.0 | 0.0 | 0.0 | 0.0 | 0.0 |
| "Hang on!" | 0.0 | 0.0 | 0.5 | 1.0 | 0.0 | 0.0 | 0.0 | 0.0 |
| "Hurry up" | 0.0 | 0.0 | 1.0 | 0.5 | 0.0 | 0.0 | 0.0 | 0.0 |
| "Stop it!" | 0.0 | 0.0 | 1.0 | 0.0 | 0.0 | 0.5 | 0.5 | 0.0 |

In that way, the register 10 for the intensity of each basic emotion are revised.

attenuation constants ($R_i$) of the basic emotions is shown in the following table.

| Basic emotion | Acceptance | Fear | Surprise | Sadness | Disgust | Anger | Expectation | Joy |
|---|---|---|---|---|---|---|---|---|
| Attenuation constants $R_i$ | 0.96 | 0.88 | 0.65 | 0.97 | 0.94 | 0.98 | 0.92 | 0.94 |

2. Change in internal emotion interaction.

Figure 5:
FIG. 5 is a diagram illustrating pervasive effects among eight basic emotions.

Eight basic emotions are set herein as shown in FIG. 5. There exit pervasive effects of interaction of excitation and inhibition among these eight basic emotions. For example, joy heals sadness and anger overcomes fear.

In addition to the mutual inhibition of opposing basic emotions, more general excitatory/inhibitory interaction is present as noted previously. For example, disgust induces sadness or anger depresses joy.

With respect to the quantitative interactive intensity for embodying such a model, a desirable intensity constant is obtained by trial and error through parameter adjustment. An example of matrix of internal interaction constants ($W_{ij}$) is shown in following table.

This time dependent attenuation is accomplished by letting the emotion intensity revisor 40 revise the eight registers 10 for the intensity of each basic emotion in accordance with the attenuation constant memory 70.

Figure 6:
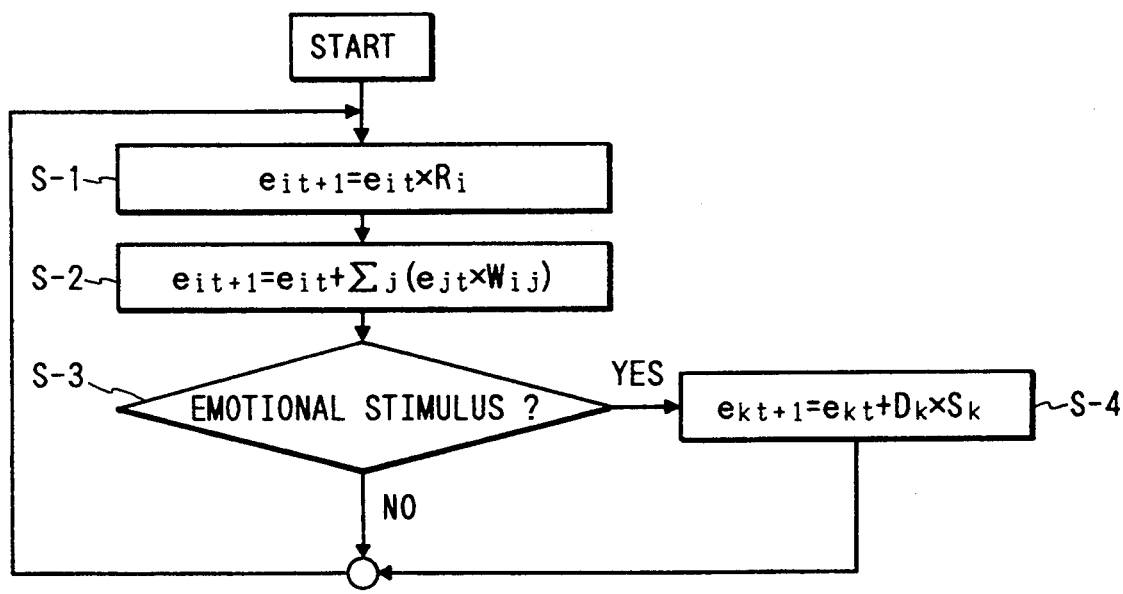
FIG. 6 is a diagram illustrating algorithm for forming pseudo-emotion.

FIG. 6 summarizes the operation of the artificial emotion system in consideration of the aforesaid three emotion changing factors.

FIG. 6 illustrates an algorithm for revision of emotion intensity with i, j, k=1~8.

When the process of producing pseudo-emotion is started in FIG. 6, the intensity $e_{it}$ of the i-th basic emotion at time t is multiplied by an attenuation constant Ri of the i-th basic emotion at unit time to obtain $e_{it+1}$ (S-1) and further $e_{it+1} = e_{it} + \Sigma J (e_{it} \times w_{ij})$ is computed as the interaction between basic emotions (S-2).

| Basic emotion | Acceptance | Fear | Surprise | Sadness | Disgust | Anger | Expectation | Joy |
|---|---|---|---|---|---|---|---|---|
| Acceptation | — | 0.28 | 0.00 | 0.03 | 0.52 | 0.08 | 0.00 | 0.42 |
| Fear | 0.45 | — | 0.28 | 0.00 | 0.00 | 0.54 | 0.00 | 0.00 |
| Surprise | 0.00 | 0.12 | — | 0.28 | 0.00 | 0.02 | 0.43 | 0.09 |
| Sadness | 0.00 | 0.00 | 0.08 | — | 0.28 | 0.00 | 0.13 | 0.51 |
| Disgust | 0.58 | 0.00 | 0.00 | 0.22 | — | 0.28 | 0.00 | 0.15 |
| Anger | 0.24 | 0.52 | 0.00 | 0.00 | 0.43 | — | 0.41 | 0.32 |
| Expectation | 0.18 | 0.08 | 0.50 | 0.24 | 0.09 | 0.09 | — | 0.45 |
| Joy | 0.51 | 0.06 | 0.00 | 0.54 | 0.27 | 0.18 | 0.32 | — |

These parameters are preserved in the internal interaction intensity storage table 50.

The emotion intensity revisor 40 revises the emotion intensity register by computing the interaction conforming to the parameter table at the timing of the clock from the clock source 80.

3. Attenuation of basic emotions with the lapse of time.

The basic emotions exponentially attenuate with the lapse of time. When the interaction between basic emotions is sufficiently small without any emotional stimulus, each basic emotion converges to zero in value, that is, to the neutral emotional status. An example of the A decision is made on whether an emotional stimulus occurs or not (S-3) and if the stimulus is absent (n), the flow returns to S-1. When such a stimulus occurs (y), an increment Dk of the k-th basic emotion resulting from the emotional stimulus is multiplied by the intensity of the emotional stimulus S and the result is added to the intensity $e_{kt}$ of the k-th basic emotion at time t.

In the above described flowchart, $\Delta t$ denotes an unit time step; $e_{it}$, intensity of i-th basic emotion at time $t$; $D_{ij}$, differential value of i-th basic emotion by j-th emotional stimulus; $W_{ij}$, interaction constant form i-th basic emotion to j-th basic emotion; $R_i$, attenuation constant of i-th basic emotion; $S_i$, effect constant of i-th basic emotion; and i, j, k (=1 to 8), index of a basic emotion.

By repeating this process, the artificial emotion system fluctuates at all times so as to offer human-like behaviors.

As set forth above, the emotion emulator according to the present invention not only has sensitivity for the emotional events in its working environment but also exhibits internal behavior of emotion itself, so that it can simulate human-like emotions. Since the emotion emulator is also provided with stability of the agent's mood which is essential when it is applied to a human-computer interface, the agent can be made to behave more like a human by giving it pseudo-emotion according to the present invention. By implementing natural interaction with the user, the exchange of intentions between the user and the agent is greatly enhanced.

What is claimed is:

1. An interactive man-machine interface, comprising:

first storage means for storing at least two sets of data representing intensities of at least two basic emotions in an artificial emotion system;

second storage means for storing a time dependent attenuation value;

decrementing means for periodically decrementing the data representing intensity of basic emotions stored in said first storage means according to said time dependent attenuation value;

detecting means for detecting an emotional stimulus input;

third storage means for storing a differential value representing sensitivity of basic emotions to emotional stimuli;

first revising means for revising the decremented data representing intensity of basic emotions according to the emotional stimulus input detected by said detecting means and the differential value stored in said third storage means;

setting means for setting a level of internal interaction between the sets of data representing intensity of basic emotions; and second revising means for further revising the decremented data representing intensity of basic emotions according to the level of internal interaction set by said setting means.

2. A man-machine interface comprising:

means for detecting predetermined stimuli from a working environment;

means for storing at least one set of data with a magnitude representing the intensity level of at least one artificial emotion;

means for revising the magnitude of each said set of data in response to said predetermined stimuli;

means for displaying an interface agent resembling a person; and means for choosing, based on the magnitude of each set of data, an expression of said interface agent from a plurality of different expressions.

3. A method of stimulating human emotions in a man-machine interface system, comprising the steps of:

storing sets of data representing intensity levels of different basic emotions;

storing predetermined facial characteristics of an interface agent resembling a person, said predetermined facial characteristics representing the sets of data at different intensity levels;

storing trigger words;

storing desired changes in the intensity levels of said different basic emotions for each said trigger word;

detecting said trigger words in the speech of a user;

revising each set of data based on the detected trigger words and said desired changes in the intensity levels;

choosing characteristics representative of each revised set of data from said predetermined facial characteristics of the agent; and displaying the agent with said chosen facial characteristics.

* * * * *